March 7, 1933. C. L. BROWN 1,899,937
SPLASH GUARD FOR MOTOR VEHICLES
Filed March 2, 1931 2 Sheets-Sheet 1
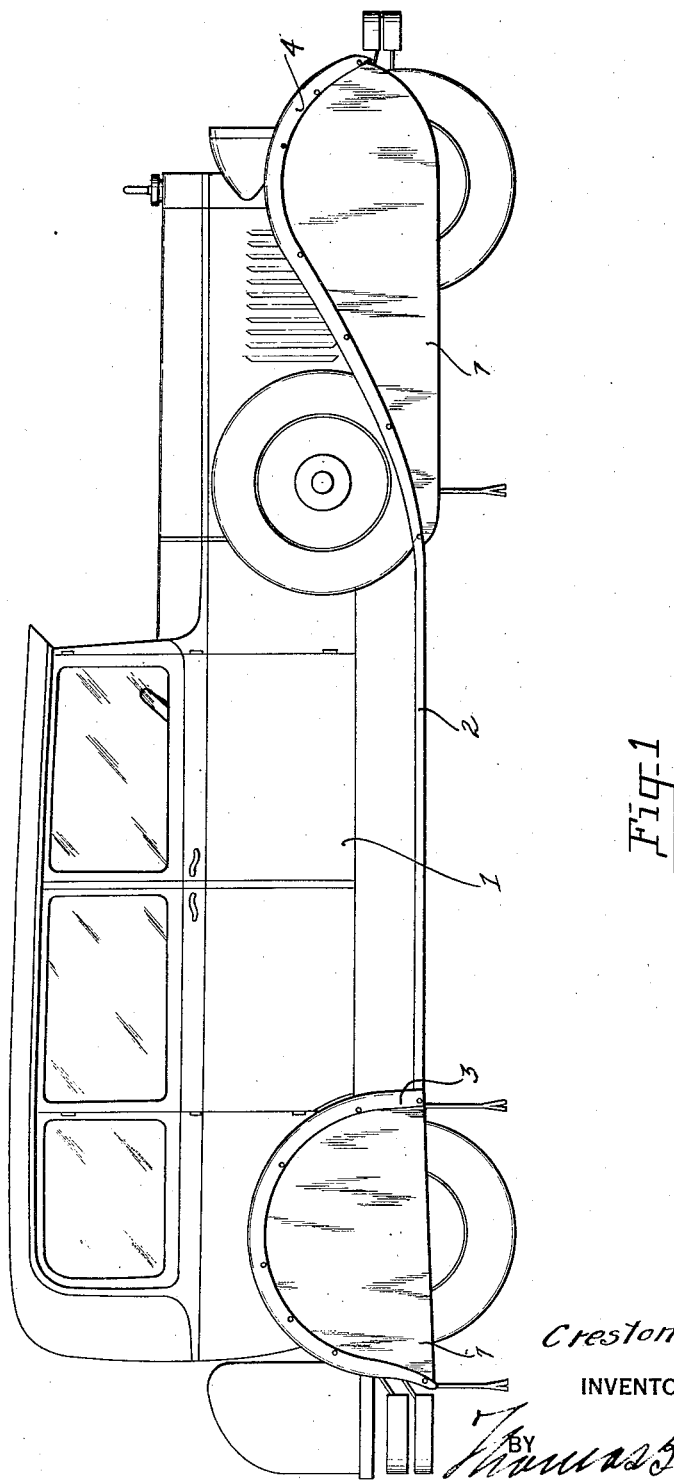
Creston L. Brown
INVENTOR March 7, 1933.  C. L. BROWN  1,899,937
SPLASH GUARD FOR MOTOR VEHICLES
Filed March 2, 1931   2 Sheets-Sheet 2
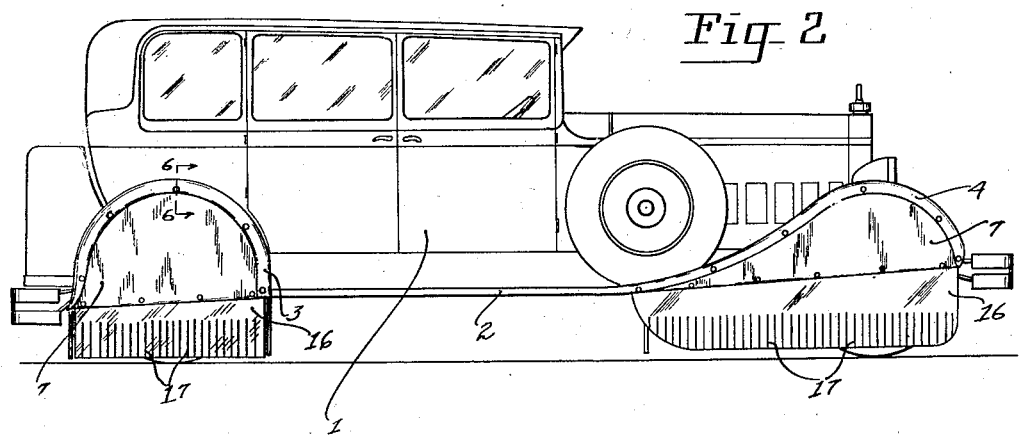
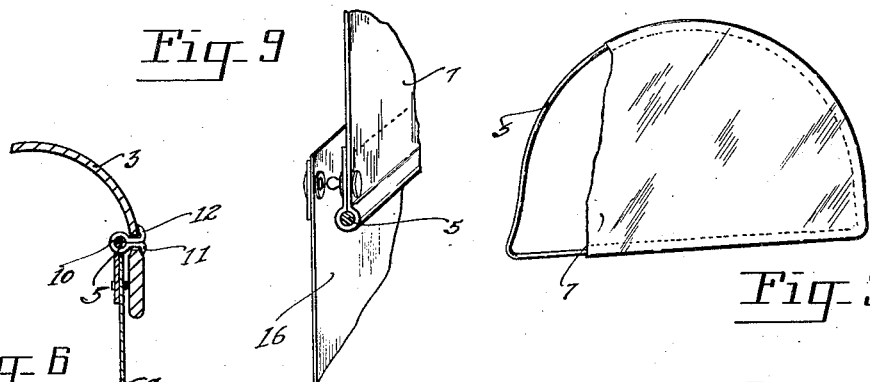
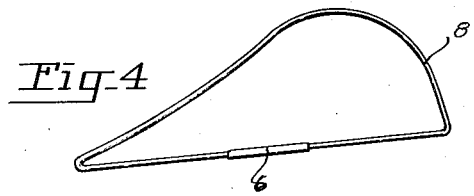
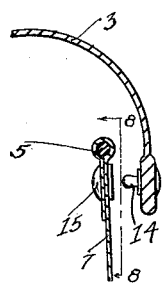
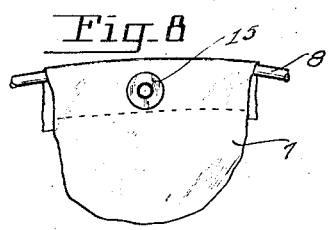
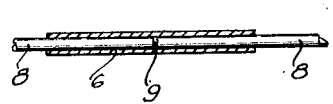
Creston L. Brown
INVENTOR
ATTORNEY Patented Mar. 7, 1933

1,899,937

UNITED STATES PATENT OFFICE

CRESTON L. BROWN, OF THE DALLES, OREGON

SPLASH GUARD FOR MOTOR VEHICLES

Application filed March 2, 1931. Serial No. 519,528.

The primary purpose and object of my invention is to place a shield upon the fenders of automobiles to prevent the wheels from throwing dust, dirt or mud splash upon the outside of the motor vehicle body upon which the same is placed and upon other vehicles being driven parallel thereto.

The invention in its preferred embodiment consists of a shield member made of durable, light material that may be detachably attached to the fenders or mud guards of motor vehicles, each being a complete unit in itself and being adapted for being removably secured to the outer wall of the fender and for depending therefrom. Shields are also placed at the forward and rear end of each of the shield elements to confine the splash from the wheel being confined within the shield members.

One of the objects of my invention is to protect the automobile from becoming dirty upon the exterior of the same.

A further object of my invention is for preventing the wheel splash from the automobile upon which my devices are placed becoming deposited upon adjacent vehicles being driven adjacent and parallel thereto.

A further object of my invention consists in providing a shield member adapted for being removably secured to the fenders of a motor vehicle.

A further object of my invention consists in providing a shield member made of relatively cheap material and one that will give a minimum of operating annoyances.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a side view of an inclosed automobile illustrating my new and improved guards in place upon the motor vehicle.

Fig. 2 is a side view of a motor vehicle illustrating my new and improved guards in place thereupon, the same being so shaped as to prevent the splash of dust, mud, water and other foreign matter being formed by the wheels and emanating from the outside thereof.

Fig. 3 is a side view, partially in section, of the shield frame adapted for being secured to the rear fender.

Fig. 4 is a side view of the frame of the shield to be secured to the front fender.

Fig. 5 is a sectional, side view of the joint portion of the shield member.

Fig. 6 is a fragmentary, sectional, end view of the rear fender and the shield secured thereto, the same being taken on line 6—6 of Fig. 2 looking in the direction indicated.

Fig. 7 is a fragmentary, sectional, end view of the shield and fender and illustrating the shield being detached from the fastening disposed upon the fender.

Fig. 8 is a side view of the mechanism illustrated in Fig. 7, the same being taken on line 8—8 of Fig. 7, looking in the direction indicated.

Fig. 9 is a fragmentary, perspective, end view of the fender and shield mechanism.

Like reference characters refer to like parts throughout the several views.

1 is the body of an automobile and 2 is the running board disposed at either side thereof. The rear fender is illustrated at 3 and the front fender is illustrated at 4. For the rear fender I preferably form a relatively stiff frame 5 made of a single piece of tubular material secured together by any suitable fastening means as by a tube 6 that may be moved longitudinally of the body element. A flexible covering 7 is secured to the frame, the same being made of leather, imitation leather, or any other suitable metallic or non-metallic material.

The front fender shield is made as illustrated in Fig. 4, the frame 8 being made of tubular material with the ends secured together in a similar manner to that heretofore described with the tube 6 being slidably disposed upon the tubular member to cover the joint 9. The same is then covered with a flexible shield material of suitable make and design. The shield may be secured to the side of the fender by any suitable fastening means as through the use of a cotter pin 10 being passed therethrough, the split ends 11 and 12 being bent over to maintain the same in place and position. The shield may be secured in place and position, through the use of snap fasteners 14 and 15. Where a full protection is required to maintain the car in the best condition, a skirt 16 may be secured to the bottom of the shield and may be formed integral with the frame of the shield, or secured thereto by any suitable fastening means.

It may be found desirable to slit the skirt as illustrated at 17 to form independent units of the bottom to prevent wind vibration of the whole structure.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A device to be used in connection with the fenders of an automobile body comprising a tubular frame shaped to the contour of the side wall of the fenders, a flexible shield formed about the frame, a plurality of pins securing the frame to the inside wall of the fenders, fasteners secured to the lower end of the shield, and a skirt removably secured to the shield, said shield being adapted for protecting the sides of the automobile and for carrying indicia.

CRESTON L. BROWN.